United States Patent
Mateo et al.

(10) Patent No.: US 9,796,625 B2
(45) Date of Patent: Oct. 24, 2017

(54) ANTI-FILMING SURFACE-ACTIVE AGENT

(71) Applicant: CHRYSO, Issy les Moulineaux (FR)

(72) Inventors: Sandrine Mateo, Ury (FR); Pascal Boustingorry, Breuillet (FR)

(73) Assignee: CHRYSO, Issy les Moulineaux (FR)

( * ) Notice: Subject to any disclaimer, the term of this patent is extended or adjusted under 35 U.S.C. 154(b) by 156 days.

(21) Appl. No.: 14/380,031

(22) PCT Filed: Feb. 21, 2013

(86) PCT No.: PCT/EP2013/053443
§ 371 (c)(1),
(2) Date: Aug. 20, 2014

(87) PCT Pub. No.: WO2013/124350
PCT Pub. Date: Aug. 29, 2013

(65) Prior Publication Data
US 2015/0027348 A1 Jan. 29, 2015

(30) Foreign Application Priority Data
Feb. 21, 2012 (FR) ..................................... 12 51561

(51) Int. Cl.
*C04B 28/02* (2006.01)
*C04B 24/02* (2006.01)
*C04B 28/14* (2006.01)
*C04B 28/16* (2006.01)
*C04B 40/00* (2006.01)
*C04B 111/21* (2006.01)
*C04B 111/60* (2006.01)

(52) U.S. Cl.
CPC ............ *C04B 24/026* (2013.01); *C04B 28/02* (2013.01); *C04B 28/145* (2013.01); *C04B 28/16* (2013.01); *C04B 40/0039* (2013.01); *C04B 40/0046* (2013.01); *C04B 2111/21* (2013.01); *C04B 2111/60* (2013.01)

(58) Field of Classification Search
CPC ....... C04B 24/00; C04B 24/026; C04B 24/32; C04B 24/34; C04B 24/36; C04B 24/085; C04B 28/02; C04B 28/145; C04B 28/16; C04B 40/0039; C04B 40/0046; C04B 2111/60; C04B 2111/21
See application file for complete search history.

(56) References Cited

U.S. PATENT DOCUMENTS

| | | |
|---|---|---|
| 3,486,916 A | 12/1969 | Cordon |
| 6,849,118 B2 | 2/2005 | Kerkar et al. |
| 2006/0100341 A1 | 5/2006 | Mosquet et al. |
| 2010/0210776 A1 | 8/2010 | Mosquet et al. |
| 2012/0097075 A1* | 4/2012 | Nawa ...................... C04B 24/00 106/724 |
| 2012/0186495 A1 | 7/2012 | Mateo et al. |

FOREIGN PATENT DOCUMENTS

| | | |
|---|---|---|
| CN | 102114166 | 7/2011 |
| EP | 0249408 A1 | 12/1987 |
| FR | 1329281 | 6/1963 |
| FR | 2 928 915 | 9/2009 |
| FR | 2 948 930 | 2/2011 |
| GB | 654 930 | 7/1951 |
| GB | 1 402 597 | 8/1975 |
| JP | 2006-193416 A | 7/2006 |
| JP | WO 2010131707 A1 * 11/2010 ............. C04B 24/00 |
| WO | WO 95/04008 A1 | 2/1995 |
| WO | WO 03/101910 A1 | 12/2003 |
| WO | WO 2008/035221 A2 | 3/2008 |
| WO | WO 2009/036128 A1 | 3/2009 |

OTHER PUBLICATIONS

"Paraffin Oil". Encyclopedia Britannica. Retrieved http://www.britannica.com/science/paraffin-hydrocarbon.*
"Chemical Admixtures". PCA. Jul. 20, 2008. Retrieved from https://web.archive.org/web/20080720125944/http://www.cement.org/basics/concretebasics_chemical.asp.*
Donnous J. 1997 "Concrete coloring with iron oxide pigment" on the world-wide-web at archimg.com/hamburger/H1-doc.htm#item12.
Kong, J. 2011 Database WPI Week 201156 Thomson Scientific, London GB; AN 2011-J99313 XP002685433; "Chinese medicinal ointment and manufacturing method thereof.".

* cited by examiner

*Primary Examiner* — Anthony J Green
(74) *Attorney, Agent, or Firm* — Knobbe, Martens, Olson & Bear, LLP

(57) ABSTRACT

The invention relates to an anti-filming surface-active admixture for hydraulic binders, including at least one fatty alcohol and at least one oil, to the method for preparing same, and to a method for preparing a hydraulic binder composition suitable for the manufacture of screeds or concretes, comprising the step of adding, to the hydraulic binder composition, the admixture according to the invention in a metered amount of 0.1 to 5 wt % with respect to the weight of the hydraulic binder.

17 Claims, No Drawings

ANTI-FILMING SURFACE-ACTIVE AGENT

FIELD OF THE INVENTION

This invention relates to a new admixture for hydraulic binder-based compositions, the method for preparing same as well as the use thereof.

BACKGROUND OF THE INVENTION

It is commonplace to pour mortar screeds on the ground in order to flatten, level or grade a floor and/or coat underfloor heating in order to then receive the upper layers (all floor types: tile flooring, soft flooring, floating wood or glued-down flooring, etc.).

After pouring, setting and surface drying of the screeds, the appearance of a surface film of several hundredths of millimeters thick, formed by calcium hydrate-based particles rising to the surface, is often observed. The fine film has folds and inesthetical flakings and considerably reduces the several adherence capacities of finishing materials intended subsequently to cover the screeds, such as plaster, adhesive ceramic, paint, various sealers or other adhesive coatings.

This type of film is also observed at the surface of other hydraulic compositions such as self-compacting concrete (SCC), a concrete capable of compacting itself in even complex and constricted formwork under the sole effect of gravity.

To obtain sufficient adhesion, it is necessary to brush, scratch or sand the surface in order to remove the film before beginning the bonding work of a covering or finishing. This work is time-consuming and expensive.

It is known from U.S. Pat. No. 6,849,118 to use an admixture comprising a fatty alcohol and an anti-shrinkage agent of the alkylene oxide type to prevent the formation of surface dust caused by the anti-shrinkage agent.

A composition is also known from WO 95/04008 that comprises $C_{14}$ to $C_{22}$ fatty alcohols, preferably in the form of an emulsion, in particular to inhibit efflorescence in the cement compositions. Efflorescence differs, however, from the described particle film of in that it results from a calcium salt carbonation reaction at the surface of cement compositions.

Due to their low melting point and hydrophobic character, fatty alcohols are, however, difficult to disperse. In solid form, they quickly agglomerate under heat or during storage under their own weight, making them difficult to use.

The use of a fatty alcohol emulsion is also known from U.S. Pat. No. 3,486,916, for limiting the evaporation of water on exterior surfaces.

Finally, the use of an admixture in powder form, comprising a fatty alcohol and an anti-caking agent is known from FR2948930, for reducing the formation of films on horizontal surfaces. Like all finely divided organic compositions, this type of composition may be flammable and/or explosive, since it comprises fatty compounds, in particular fatty alcohols in finely divided powder form. It is therefore necessary to take precautions in the storage and handling of the product (for example, grounding of installations).

SUMMARY OF THE INVENTION

The objective of this invention is therefore to propose an admixture, advantageously in liquid form, making it possible to reduce the formation of films on horizontal surfaces of hydraulic compositions not having the disadvantages described above.

Another objective of the present invention is to provide such an admixture that is liquid, easy to use and stable at temperatures of 5 to 60° C., as well as over time (stable in storage).

According to the invention, this problem is solved by an admixture comprising at least one fatty alcohol and at least one oil.

According to a first aspect, the invention therefore relates to an anti-filming surface admixture for hydraulic binders comprising at least one fatty alcohol and at least one oil.

DETAILED DESCRIPTION OF THE PREFERRED EMBODIMENT

The term "fatty alcohol" refers to compounds comprising a polar function and a carbon chain comprising more than 8 carbon atoms.

The term "oil" refers to an exclusively or essentially hydrocarbon compound not comprising an alcohol function, having a melting point below 40° C., and preferably below 30° C. In the context of the invention, the term "oil" is also intended to cover mineral, vegetal and animal oils as well as derivatives thereof such as fatty acid esters of vegetable oil.

The term "hydraulic binder" refers to any compound having the property of being hydrated in the presence of water and the hydration of which makes it possible to obtain a solid having mechanical characteristics. The hydraulic binder can be a cement according to standard EN 197-1 and in particular a Portland cement, and in particular a CEM I, CEM II, CEM III, CEM IV or CEM V cement according to the Cement standard NF EN 197-1. The cement can therefore in particular include mineral additions.

The term "mineral additions" refers to slag (as defined in Cement standard NF EN 197-1, paragraph 5.2.2), steel slag, pozzolanic materials (as defined in the Cement standard NF EN 197-1, paragraph 5.2.3), fly ash (as defined in Cement standard NF EN 197-1, paragraph 5.2.4), calcined schist (as defined in Cement standard NF EN 197-1, paragraph 5.2.5), limestone (as defined in Cement standard NF EN 197-1, paragraph 5.2.6) or silica fume (as defined in Cement standard NF EN 197-1, paragraph 5.2.7) or mixtures thereof.

The term "concrete" refers to a mixture of hydraulic binders, aggregate, sand, water, optionally additives, and optionally mineral additions. The term "concrete" also includes mortars.

The term "hydraulic binder" also encompasses anhydrous or hydrated calcium sulfates that make it possible to produce calcium sulfate-based screeds.

The term "calcium sulfate-based screed" refers to compositions in which the calcium sulfate having hydraulic properties represents at least 85% by weight of the total hydraulic binder or, if admixtures are used, at least 50% and less than 85%. The calcium sulfate can be hemihydrate, alpha or beta, or anhydrite, for example anhydrite II or III. The materials for screeds generally satisfy the conditions provided in standards EN 13813 and 13454-1 relating to mortars for screeds and binders (hydraulic) and calcium sulfate for screeds.

In a particularly preferred manner, the admixture of the invention is liquid at room temperature (i.e. the melting point of the admixture is below 40° C., and preferably below 30° C.).

According to the invention, the anti-film admixture for hydraulic binders includes at least one fatty alcohol and one oil.

The fatty alcohol can in particular be a fatty alcohol or a fatty alcohol-derived compound. It preferably comprises 8 to 22 carbon atoms, preferably 10 to 18 carbon atoms and very specifically 16 to 18 carbon atoms, advantageously in the form of a carbon chain. The carbon chain can be linear or branched, saturated or unsaturated. Preferably, the fatty alcohol is a primary fatty alcohol, in which the alcohol group is at the end of the chain.

Particularly preferred are the fatty alcohols comprising a saturated straight-chain carbon, such as hexadecan-1-ol and octadecan-1-ol or a mixture thereof.

The admixture according to the invention can contain one or more fatty alcohol(s), for example when it is a fatty alcohol of natural origin.

The oil can in particular be a mineral oil, a vegetable oil, a fatty acid ester of vegetable oil, or a mixture thereof.

The mineral oil can be an aliphatic, a paraffinic or a naphthenic mineral oil, or a mixture thereof, preferably a paraffin oil, and not comprising any polar function. Preferably, the mineral oil is a linear or branched, saturated hydrocarbon group comprising 8 to 30 carbon atoms, preferably 11 to 25 carbon atoms, or a mixture. For example, the mineral oil is a compound of formula $C_nH_{2n+2}$ with n being between 8 and 30, preferably between 11 and 25, or a mixture of such compounds, for example a mixture of a compound of formula $C_nH_{2n+2}$ with n being between 11 and 25.

The vegetable oil can be chosen from rapeseed oil, palm oil, copra oil, castor oil, peanut oil, grape seed oil, corn oil, canola oil, linseed oil, coconut oil, soybean oil, sunflower oil and mixtures thereof.

The use of an oil advantageously makes it possible to impart a certain fluidity on the admixture and enable good cold stability to be obtained while avoiding crystallization of the fatty alcohol. Without being limited to any one theory, it has been demonstrated that the addition of 2% mineral oil enables the admixture to be preserved in liquid form at 3° C.

The admixture according to the invention can also comprise a compound of formula (I) (glycol):

$$RO(AO)_nH \quad (I)$$

wherein:
R is a hydrogen atom or an alkyl group, linear or branched, comprising 1 to 7 carbon atoms;
A is an alkylene, linear or branched, comprising 1 to 3 carbon atoms;
n is an integer between 11 and 70.

Preferably, in the compound of formula (I), R is a hydrogen atom.

Preferably, in the compound of formula (I), A is an ethylene or propylene group, preferably propylene.

Preferably, in the compound of formula (I), n is an integer between 11 and 18.

Preferably, the compound of formula (I) is such that R is a hydrogen atom, A is a propylene and n is 15.

Glycol is advantageously used, in the context of the invention, as a fatty alcohol solvent.

The admixture can include, preferably 0 to 99% by weight glycol, 0.5 to 99.5% by weight mineral oil and 0.5 to 30% by weight fatty alcohol.

It is suitable for the admixture according to the invention to be clear and homogeneous, i.e. for the admixture not to contain compounds that are non-dissolved at room temperature (25° C.), so as to provide a product that is stable in storage and handling. Thus, preferably, the admixture comprises 0 to 99% by weight glycol, 0.5 to 99.5% by weight mineral oil and 0.5 to 15% by weight fatty alcohol. Preferably, the admixture comprises 0 to 76% glycol, 0.5 to 99% by weight mineral oil and 1 to 4% by weight fatty alcohol. The percentages are expressed as a weight with respect to the total weight of the admixture.

Advantageously, the admixture according to the invention is constituted by the components mentioned above. However, it may be useful in some cases to add other agents, in particular anti-foaming agents, plasticizers, in particular superplasticizers, setting modifiers and coloring agents.

The preparation of the admixture according to the invention is quick and easy and can be performed with simple means. According to another aspect, the invention therefore relates to a method for preparing an admixture according to the invention, comprising the steps of:
(i) mixing fatty alcohol and oil;
(ii) stirring;
(iii) heating until complete dissolution of the fatty alcohol.

The method of the invention can also include a preliminary step of mixing the compound of formula (I) and oil.

The admixture thus obtained is in liquid form and can then be packaged without any problem in a bottle. The admixture thus packaged is stable during storage for a number of months even at high or low temperature.

The presentation in liquid form also greatly facilitates the use of the admixture according to the invention and avoids problems of safety associated with the use of admixture in powder form comprising fatty alcohols. Indeed, a fatty alcohol in powder form, if finely divided, can cause an explosion when mixed with air.

In fact, the admixture according to the invention is a mass admixture and not a surface admixture. It is therefore advantageously dispersed homogeneously throughout the mass of the hydraulic binder, before, during or after mixing.

The admixture according to the invention is added to the dry hydraulic binder, or to the sand or aggregate before mixing or during mixing, and preferably the admixture is added to the mixing water.

In general, the proportion of the admixture according to the invention is preferably 0.1 to 5% by weight with respect to the weight of hydraulic binder.

The mixing and pouring of the hydraulic binders is performed in the usual manner. Advantageously, the admixture does not interfere with the setting of the hydraulic binder and does not affect the properties of the hardened material.

The admixture according to the invention thus added to the mass with the hydraulic binder makes it possible to prevent the appearance of a film formed by calcium hydroxide particles after pouring, setting and surface drying of the hydraulic binders. The absence of a film makes it possible in particular to increase the adhesion of finishing materials to the surfaces of the admixed hydraulic binders without the need for brushing, and also improves the hardness of the surfaces.

According to a final aspect, the invention therefore relates to a method for preparing a hydraulic binder composition suitable for producing screeds or concrete comprising the step consisting in adding, to the hydraulic binder, the admixture according to the invention in a proportion of 0.1 to 5% by weight with respect to the weight of hydraulic binder.

In one embodiment, the admixture of this invention is particularly suitable for preparing a hydraulic binder composition for the production of cement screeds.

In another embodiment, the admixture of this invention is particularly suitable for the preparation of a hydraulic binder composition for the production of anhydrite screeds, a screed in which the hydraulic binder comprises an anhydrous calcium sulfite. Preferably, in the context of the anhydrite screed, the hydraulic binder is an anhydrous calcium sulfate.

In another embodiment, the admixture of this invention is particularly suitable for the preparation of a hydraulic binder composition for the preparation of hemihydrate-based screeds, a screed in which the hydraulic binder comprises an alpha- or a beta-, and preferably an alpha-hemihydrate calcium sulfate. Preferably, in the context of the hemihydrate-based screed, the hydraulic binder is an alpha- or a beta-, and preferably an alpha-hemihydrate calcium sulfate.

This invention also relates to the use of the admixture described above as an anti-filming surface admixture for hydraulic binders.

The invention also relates to the use of the admixture of the invention as an anti-filming surface admixture for hydraulic binders, wherein the hydraulic binder is suitable for the production of screeds or concrete and the admixture proportion is 0.1 to 5% by weight with respect to the weight of hydraulic binder.

The invention also relates to a method for preventing the formation of a film on the surface of hydraulic binders in which an admixture according to the invention is used, in particular added to said hydraulic binder.

The invention will be better understood in view of the following examples provided by way of illustrative and non-limiting examples.

EXAMPLES

Example 1: Composition and Production of an Anhydrite Screed with a Mineral Oil+Compound of Formula (I)+Fatty Alcohol Admixture According to the Invention In a Rayneri mixer, an admixed mortar based on anhydrous calcium sulfate having the composition indicated in table 1 below is prepared according to the following mixing protocol:

Dry homogenization of the sand at a low speed for 0-30 seconds;
Pre-humidification of the sand with ⅓ of the total water for between 30-60 seconds, then stopping of the mixer;
At 300 seconds, addition of anhydrous calcium sulfate, and homogenization for between 300-330 seconds at low speed;
Addition of the remainder of the water with the dispersant and the admixture according to the invention comprising a fatty alcohol (Nafol 1618®) (4%), a compound of formula (I) (Pluriol P900®) (86%) and a mineral oil (Hydroseal G250H®) (10%), for between 330 and 390 seconds;
Mixing at low speed for between 390-420 seconds;
Stopping of the mixer to scrape the edges and bottom of the bowl with a trowel for between 420-450 seconds; and
High-speed mixing for between 450 and 510 seconds.

The admixture according to the invention is added in an amount of 1300 g/m³ as indicated in tables 5 and 6.

TABLE 1

Anhydrous calcium sulfate-based mortar composition

| Component | Quantity |
|---|---|
| Anhydrous calcium sulfate | 650 kg/m³ |
| Sand 0/4 mm Bernières (France) | 1350 kg/m³ |
| Dispersant (CHRYSO ® Fluid Premia 196, sold by CHRYSO, France) | 0.27% by total weight* |
| Water | 280 kg/m³ |

*with respect to the quantity of anhydrous calcium sulfate

The cone spread measured ($\varnothing_{upper}$=7 cm, $\varnothing_{lower}$=10 cm, height=6 cm) immediately after preparation was 260±10 mm. The mortar thus produced is poured into square molds with pre-oiled oblique edges of dimensions 40*40 cm so as to produce mortar slabs, and a bar for debubbling and leveling is run over the surface of said mortar in order to obtain a smooth surface.

Example 2: Composition and Production of an Anhydrite Screed with a Mineral Oil+Fatty Alcohol Admixture According to the Invention In a Rayneri mixer, an admixed mortar based on anhydrous calcium sulfate having the composition indicated in table 2 below is prepared according to the following mixing protocol:

Dry homogenization of the sand at a low speed for 0-30 seconds;
Pre-humidification of the sand with ⅓ of the total water for between 30-60 seconds, then stopping of the mixer;
At 300 seconds, addition of anhydrous calcium sulfate, and homogenization for between 300-330 seconds at low speed;
Addition of the remainder of the water with the dispersant and the admixture according to the invention comprising a fatty alcohol (Nafol 1618®) (4%) and a mineral oil (Hydroseal G250H®) (96%), for between 330 and 390 seconds;
Mixing at low speed for between 390-420 seconds;
Stopping of the mixer to scrape the edges and bottom of the bowl with a trowel for between 420-450 seconds; and
High-speed mixing for between 450 and 510 seconds.

The admixture according to the invention is added in an amount of 1105 g/m³ as indicated in table 6.

TABLE 2

Anhydrous calcium sulfate-based mortar composition

| Component | Quantity |
|---|---|
| Anhydrous calcium sulfate | 650 kg/m³ |
| Sand 0/4 mm Bernières (France) | 1350 kg/m³ |
| Dispersant (CHRYSO ® Fluid Premia 196, sold by CHRYSO, France) | 0.27% by total weight* |
| Water | 280 kg/m³ |

*with respect to the quantity of anhydrous calcium sulfate

The cone spread measured ($\varnothing_{upper}$=7 cm, $\varnothing_{lower}$=10 cm, height=6 cm) immediately after preparation was 260±10 mm. The mortar thus produced is poured into square molds with pre-oiled oblique edges of dimensions 40*40 cm so as to produce mortar slabs, and a bar for debubbling and leveling is run over the surface of said mortar in order to obtain a smooth surface.

Example 3: Composition and Production of a Cement Screed According to the Invention In a Rayneri mixer, an admixed mortar based on cement having the composition indicated in table 3 below is prepared according to the following mixing protocol:

Dry homogenization of the sand at a low speed for 0-30 seconds;

Pre-humidification of the sand with ⅓ of the total water for between 30-60 seconds, then stopping of the mixer;

At 300 seconds, addition of cement and filler and homogenization for between 300-330 seconds at low speed;

Addition of the remainder of the water with the dispersant and the admixture according to the invention comprising a fatty alcohol (Nafol 1618®) (4%), a compound of formula (I) (Pluriol P900®) (86%) and a mineral oil (Hydroseal G250H®) (10%), for between 330 and 390 seconds;

Mixing at low speed for between 390-420 seconds;

Stopping of the mixer to scrape the edges and bottom of the bowl with a trowel for between 420-450 seconds; and High-speed mixing for between 450 and 510 seconds.

The cone spread measured ($\varnothing_{upper}$=7 cm, $\varnothing_{lower}$=10 cm, height=6 cm) immediately after preparation was 260±10 mm. The mortar thus produced is poured into square molds with pre-oiled oblique edges of dimensions 40*40 cm so as to produce mortar slabs, and a bar for debubbling and leveling is run over the surface of said mortar in order to obtain a smooth surface.

TABLE 3

Cement-based mortar composition

| Component | Quantity |
|---|---|
| CEM I cement | 280 kg/m³ |
| Filler Durcal 10 (sold by OMYA, France) | 380 kg/m³ |
| Sand Bernières (France) | 1280 kg/m³ |
| Dispersant (CHRYSO ® Fluid Optima 100, sold by CHRYSO, France) | 1.2% by total weight* |
| Water | 260 kg/m³ |

*with respect to the quantity of binder (cement + filler)

Example 4: Composition and Production of a Self-Compacting Concrete (SCC) According to the Invention In a Skako Couvrot mixer, an admixed SCC having the composition indicated in table 4 below is prepared according to the following mixing protocol:

Dry homogenization of the sand at a low speed for 0-30 seconds;

Pre-humidification of the sand with ⅓ of the total water of all of the aggregate for between 30-60 seconds, then stopping of the mixer;

At 300 seconds, addition of cement and filler and dry mixing for between 300-330 seconds at low speed;

Addition of the remainder of the water with the superplasticizer and admixture according to the invention comprising a fatty alcohol (Nafol 1618®) (4%), a compound of formula (I) (Pluriol P900®) (86%) and a mineral oil (Hydroseal G250H®) (10%), for between 330 and 390 seconds; and Stopping of the mixer at 510 seconds.

The standardized cone spread (Abrams cone) of the concrete measured immediately after preparation was 700±10 mm. The concrete thus produced is poured into square molds with pre-oiled oblique edges of dimensions 40*40 cm so as to produce concrete slabs, and a bar for debubbling and leveling is run over the surface of the concrete in order to obtain a smooth surface.

TABLE 4

Self-compacting cement composition

| Component | Quantity |
|---|---|
| CEM I cement | 280 kg/m³ |
| Filler Erbray 10 (sold by OMYA, France) | 160 kg/m³ |
| Sand 0/4 Bernières (France) | 887 kg/m³ |
| Gravel 6/10 Villermain (France) | 160 kg/m³ |
| Gravel 9/18 Loire (France) | 653 kg/m³ |
| Dispersant (CHRYSO ® Fluid Optima 350, sold by CHRYSO, France) | 0.7% by total weight* |
| Water | 213 kg/m³ |

*with respect to the quantity of binder (cement + filler)

Comparison Example 5: No Admixture

In order to evaluate the effect of the admixture according to the invention, an anhydrite screed was prepared according to example 1, without the admixture according to the invention.

Part of the screeds obtained was evaluated as such, without treatment (example 5A) whereas another part was subjected to sanding (example 5B).

Comparison Example 6: Fatty Alcohol Only

In order to evaluate the effect of the admixture according to the invention, an anhydrite mortar slab was prepared according to example 1 by adding, in addition, a mixture of 66% by weight 1-hexadecanol and 33% by weight 1-octadecanol sold under the name NAFOL 1618 by the SASOL company (with D50≈40 μm).

The fatty alcohol is added during the mixing at the same time as the mixing water, in an amount of 250 g/m³ as indicated in tables 5 and 6.

Evaluation of Adhesion

After 7 days, stoneware squares having a dimension of 50×50 are adhered to the surface of the slabs obtained in examples 1, 2, 5 and 6 above by means of a high-bond tiling mortar (LANKO Prolidal Plus 5024 adhesive sold by the PAREX LANKO company). This adhesive mortar is applied according to standard NF EN 1348, which consists in:

spreading the adhesive mortar with a 5×5×5 mm square-toothed comb;

depositing a 2 kg-load for 25 to 35 seconds on each square during bonding, with 9 squares being adhered to each slab;

drying the adhesive mortar for 21 days at room temperature (according to the requirements of standard NF EN 1348);

adhering pullout tees on the ceramic tiles by means of an epoxy adhesive (LANKO 723, sold by the PAREX LANKO company); and one day later, pulling out the tiles by means of the tees, measuring the force needed by means of a Dynatest dynamometer.

A fracture between two materials assembled by bonding may spread in two ways: either inside the adhesive seal or the substrate (screed or concrete)—a cohesive rupture; or at the surface—an adhesive rupture.

A cohesive rupture indicates that the interface behaved more strongly than the core of the adhesive or the substrate (screed or concrete). Conversely, for an adhesive rupture, the interface was weaker.

The mode of rupture (adhesive or cohesive), as well as the tensile force necessary to pull the tiles away from the slabs, enable the adhesion capacity of the surfaces to be evaluated. The results obtained are presented in table 5 below.

TABLE 5

Evaluation of adhesion

| EXAMPLE | Admixtures/Treatment | Amount in g/m$^3$ | Tensile stress [MPa]/ Rupture mode |
|---|---|---|---|
| 1 | Mixture of fatty alcohol + glycol + mineral oil | 1300 g/m$^3$ | 2.2 MPa/adhesive |
| 5A | No admixture, not sanded | — | 0.4 MPa/adhesive |
| 5B | No admixture, sanded | — | 2.0 MPa/cohesive |
| 6 | Non-anti-caking fatty alcohol | 250 g/m$^3$ | Non-homogeneous results due to poor dispersion of the product in the screed |

Evaluation of the Surface Hardness

To evaluate the effect of the admixture according to the invention on the surface hardness, the slabs prepared in examples 1, 2, 5 and 6 were tested by means of a device called Perfotest type CSTB or Baronnie test.

The Perfotest enables reproducible stresses to be produced on horizontal surfaces. It is equipped with a 5-corner punch intended to measure the hardness of a P2- and P3-class coating. The P2 and P3 classes make it possible to classify the strength of a coating to the punching, which strength varies from P1 (low) to P4 (high), according to the UPEC classification of floor coverings and materials. Classes P2 and P3 are therefore intermediate categories.

According to the height at which the punch is released, a different force is applied, P3 being greater than P2. The results are expressed in number of tiles detached, damaged or intact. Thus, the greater the number of intact tiles, the greater the surface hardness is, or the less the surface film is present, both for a P2 and a P3 classification. The tests are performed directly on the surface of the slabs free of any surface covering. The measurements are performed four times in different locations on each slab both for P2 and P3 tests.

The results of the test are presented in table 6 below.

TABLE 6

Evaluation of surface hardness

| EXAMPLE | Admixtures/Treatment | Amount in g/m$^3$ | Surface hardness |
|---|---|---|---|
| 1 | Mixture of fatty alcohol + glycol + mineral oil | 1300 g/m$^3$ | +++ |
| 2 | Mixture of fatty alcohol + mineral oil | 1105 g/m$^3$ | +++ |
| 5A | No admixture according to the invention, not sanded | — | — |
| 5B | No admixture according to the invention, sanded | — | + |
| 6 | Fatty alcohol | 250 g/m$^3$ | Non-homogeneous |

TABLE 6-continued

Evaluation of surface hardness

| EXAMPLE | Admixtures/Treatment | Amount in g/m$^3$ | Surface hardness |
|---|---|---|---|
| | | | results due to poor dispersion of the product in the screed |

The admixture according to the invention therefore makes it possible to notably improve the surface hardness and the surface adhesion capacity cement- or calcium sulfate-based hydraulic binders while being easily dispersible and stable in storage.

The admixtures of the present invention advantageously have good stability under cold conditions, in particular down to −3° C.

What is claimed is:

1. A method of making a hydraulic binder with improved resistance to formation of a surface film, the method consisting essentially of combining:
   (a) at least one fatty alcohol,
   (b) at least one oil, and
   (c) the hydraulic binder,
   wherein the hydraulic binder is more resistant to formation of the surface film compared to when the hydraulic binder is not combined with the at least one fatty alcohol and the at least one oil.

2. The method according to claim 1, wherein the at least one fatty alcohol is in liquid form at room temperature.

3. The method according to claim 1, wherein the fatty alcohol is a primary fatty alcohol.

4. The method according to claim 1, wherein the fatty alcohol comprises 8 to 22 carbon atoms.

5. The method according to claim 4, wherein the fatty alcohol is selected from the group consisting of hexadecan-1-ol, octadecan-1-ol and a mixture thereof.

6. The method according to claim 5, wherein the at least one oil is a mineral oil, vegetable oil or a fatty acid ester of a vegetable oil.

7. The method according to claim 1, wherein the at least one oil is an aliphatic, paraffinic or naphthenic mineral oil.

8. A The method according to claim 1, wherein the mineral oil is a compound of formula $C_nH_{2n+2}$ with n being between an integer between 8 and 30.

9. The method according to claim 1, wherein the hydraulic binder is suitable for the production of screeds or concrete and wherein the at least one fatty alcohol and the at least one oil together constitute 0.1 to 5% by weight of the hydraulic binder.

10. A method of making a hydraulic binder with improved resistance to formation of a surface film, the method consisting essentially of combining:
   (i) the hydraulic binder; and
   (ii) an admixture comprising:
      (a) at least one fatty alcohol,
      (b) at least one oil, and
      (c) a compound of formula (I), $$RO(AO)_nH \quad (I)$$

wherein:
   R is a hydrogen atom or an alkyl group, linear or branched, comprising 1 to 7 carbon atoms;
   A is an alkylene, linear or branched, comprising 1 to 3 carbon atoms; and
   n is an integer between 11 and 70, and wherein the hydraulic binder is more resistant to formation of the surface film compared to when the hydraulic binder is not combined with the at least one fatty alcohol the at least one oil and the compound of formula I.

11. The method according to claim 10, wherein the admixture comprises up to 99% by weight of a compound of formula (I), 0.5 to 99.5% by weight of a mineral oil and 0.5 to 30% by weight of a fatty alcohol, with respect to the total weight of the admixture.

12. The method according to claim 10, wherein the admixture comprises 0 to 76% by weight of a compound of formula (I), 0.5 to 99% by weight of a mineral oil and 1 to 4% by weight of a fatty alcohol, with respect to the total weight of the admixture.

13. The method according to claim 10, wherein the admixture is used at a proportion of 0.1 to 5% by weight with respect to the weight of the hydraulic binder.

14. The method according to claim 13, wherein the screed is an anhydrite screed, a cement screed or a hemihydrate-based screed.

15. The method of claim 11, wherein the hydraulic binder with improved resistance to formation of a surface film-comprises 0.5 to 15% by weight of a fatty alcohol, with respect to the total weight.

16. A method of forming a mortar screed, comprising pouring, setting and surface drying a hydraulic binder-based composition consisting essentially of:

a hydraulic binder;
at least one fatty alcohol; and
at least one oil
wherein the hydraulic binder is more resistant to formation of a surface film compared to when the hydraulic binder is not combined with the at least one fatty alcohol and the at least one oil.

17. A method of forming a mortar screed, comprising pouring, setting and surface drying a hydraulic binder-based composition consisting essentially of:

a hydraulic binder;
at least one fatty alcohol;
at least one oil; and
a compound of formula I:

$$RO(AO)_nH \quad (I),$$

wherein:
R is a hydrogen atom or an alkyl group, linear or branched, comprising 1 to 7 carbon atoms;
A is an alkylene, linear or branched, comprising 1 to 3 carbon atoms;
n is an integer between 11 and 70; and
wherein the hydraulic binder is more resistant to formation of a surface film compared to when the hydraulic binder is not combined with the at least one fatty alcohol and the at least one oil a compound of formula (I).

* * * * *